United States Patent
Kotlyar et al.

(10) Patent No.: US 9,664,588 B2
(45) Date of Patent: May 30, 2017

(54) GRIPPER FOR TEST AND ISOLATION PLUGS

(71) Applicant: EST Group, Inc., Hatfield, PA (US)

(72) Inventors: Alex Kotlyar, Warwick, PA (US); Danko Kobziar, Lansdale, PA (US); Jim Berneski, Warrington, PA (US)

(73) Assignee: EST Group, Inc., Hatfield, PA (US)

( * ) Notice: Subject to any disclaimer, the term of this patent is extended or adjusted under 35 U.S.C. 154(b) by 316 days.

(21) Appl. No.: 14/310,241

(22) Filed: Jun. 20, 2014

(65) Prior Publication Data

US 2015/0369689 A1    Dec. 24, 2015

(51) Int. Cl.
| | | |
|---|---|---|
| *F16L 55/10* | (2006.01) | |
| *G01M 3/02* | (2006.01) | |
| *G01M 3/28* | (2006.01) | |
| *F16L 55/11* | (2006.01) | |

(52) U.S. Cl.
CPC ......... *G01M 3/022* (2013.01); *F16L 55/1108* (2013.01); *G01M 3/2815* (2013.01)

(58) Field of Classification Search
USPC .................................................. 138/90, 89
See application file for complete search history.

(56) References Cited

U.S. PATENT DOCUMENTS

| | | | | |
|---|---|---|---|---|
| 2,375,995 A | * | 5/1945 | Kaeser | G01M 3/022 138/89 |
| 2,824,577 A | * | 2/1958 | Grunsky | G01M 3/022 138/90 |
| 2,934,361 A | * | 4/1960 | Young | F16L 55/1604 138/89 |
| 4,140,040 A | * | 2/1979 | Modrey | F16B 37/122 138/89 |
| 4,381,800 A | * | 5/1983 | Leslie | G01N 3/12 138/90 |
| 4,447,915 A | * | 5/1984 | Weber | A61F 2/30723 606/95 |
| 4,498,811 A | * | 2/1985 | Fern | F16L 1/20 138/89 |
| 4,602,500 A | * | 7/1986 | Kelly | G01M 3/022 138/90 |
| 4,760,868 A | * | 8/1988 | Saxon | F16L 55/136 138/89 |
| 4,817,671 A | | 4/1989 | Mathison et al. | |
| 5,011,337 A | * | 4/1991 | Clark | E21D 21/008 405/259.1 |
| 5,289,851 A | * | 3/1994 | Jorgensen | F28F 11/02 138/89 |
| 5,676,174 A | | 10/1997 | Berneski, Jr. et al. | |
| 5,797,431 A | | 8/1998 | Adams | |

(Continued)

OTHER PUBLICATIONS

International Search Report and Written Opinion of the ISA issued in International PCT Application No. PCT/US2014/058198 on Dec. 24, 2014.

*Primary Examiner* — James Hook
(74) *Attorney, Agent, or Firm* — Howson & Howson, LLP

(57) ABSTRACT

A gripper for a test or isolation plug is provided. The gripper includes at least one gripper segment having a pipe or tube confronting surface with a plurality of separate rows of gripper teeth longitudinally-spaced apart on the surface. Each of the separate rows of gripper teeth comprising an alternating array of individual tips and gaps such that each row is serrated along its length.

18 Claims, 15 Drawing Sheets

(56) References Cited

U.S. PATENT DOCUMENTS

| | | | |
|---|---|---|---|
| 6,461,092 B2* | 10/2002 | Tseng | F16B 13/128 |
| | | | 411/178 |
| 6,467,336 B1 | 10/2002 | Gotowik | |
| 6,601,437 B2 | 8/2003 | Gotowik | |
| 7,546,847 B2* | 6/2009 | Morrison | F16L 55/136 |
| | | | 137/317 |
| 2003/0167827 A1 | 9/2003 | Berneski, Jr. et al. | |
| 2004/0003928 A1* | 1/2004 | Frazier | E21B 33/1204 |
| | | | 166/387 |
| 2004/0074549 A1* | 4/2004 | Allen | F16L 55/132 |
| | | | 138/89 |
| 2004/0168734 A1* | 9/2004 | Serret | F16L 55/136 |
| | | | 138/89 |
| 2010/0083738 A1 | 4/2010 | Padden | |
| 2010/0147408 A1* | 6/2010 | Tyson | E03F 7/02 |
| | | | 138/40 |
| 2012/0024409 A1* | 2/2012 | Kunzmann | F16L 37/0925 |
| | | | 138/89 |

* cited by examiner

GRIPPER FOR TEST AND ISOLATION PLUGS

BACKGROUND

The present invention relates to plugs for gripping and forming fluid-tight seals with inner or outer peripheries of pipes, pipelines, tubes, pressure vessels and the like adjacent open ends thereof. More specifically, the present invention relates to components of plugs enabling the plug to grip and/or bite into the inner or outer diameter of pipe or tube walls and/or to withstand differential pressure across the seal created by the plug. For purposes of example, the plugs may include hydrostatic test plugs, vacuum test plugs or the like for use in pressure testing pipes, pipelines, tubes, pressure vessels, pressure retaining components, and the like and isolation plugs for use in isolating segments of pipes and tubes for any reason such as painting or the like, for forming night caps, for hydrostatically testing weld joints of welded flange-to-pipe connections, and for isolating pipe or tube ends during cutting, grinding and/or welding operations.

It is often required to perform leak tests or verify structural integrity or strength of pipes, pipelines, tubes, pressure vessels, flange-to-pipe connections, pipe-to-pipe connections, and the like. It may also be necessary to isolate the open end of a pipe from vapors that may be contained within the pipe when performing operations adjacent the end of the pipe, such as adding a flange or making some other pipe connection. For example, a pipe may need to be temporarily sealed adjacent to an open end thereof and pressurized with a fluid such as gas, including air or nitrogen, or a liquid such as a hydraulic fluid. Depending upon the material and thickness of the pipe, the pipe may be pressure rated, and a test or isolation plug used to form one or more seals adjacent an open end of the pipe must be able to withstand at least the pressure rating of the pipe and must be able to resist movement, sliding, failure, blow-out and/or leakage during such working pressures.

High-pressure test and isolation plugs may include components configured to be urged radially outward into engagement with an inner peripheral wall of a pipe or tube or radially inward into engagement with an outer peripheral wall of a pipe or tube. A gripping function is required to enable the plug to resist movement, sliding, failure, blow-out and/or leakage during testing at working pressures. Any movement of the plug or its gripping components relative to the sealed pipe must be avoided, particularly when testing at high pressures.

BRIEF DESCRIPTION OF THE DRAWINGS

The foregoing and other objects, features and advantages of the embodiments disclosed herein should become apparent from the following description when taken in conjunction with the accompanying drawings.

DETAILED DESCRIPTION

Figure 1:
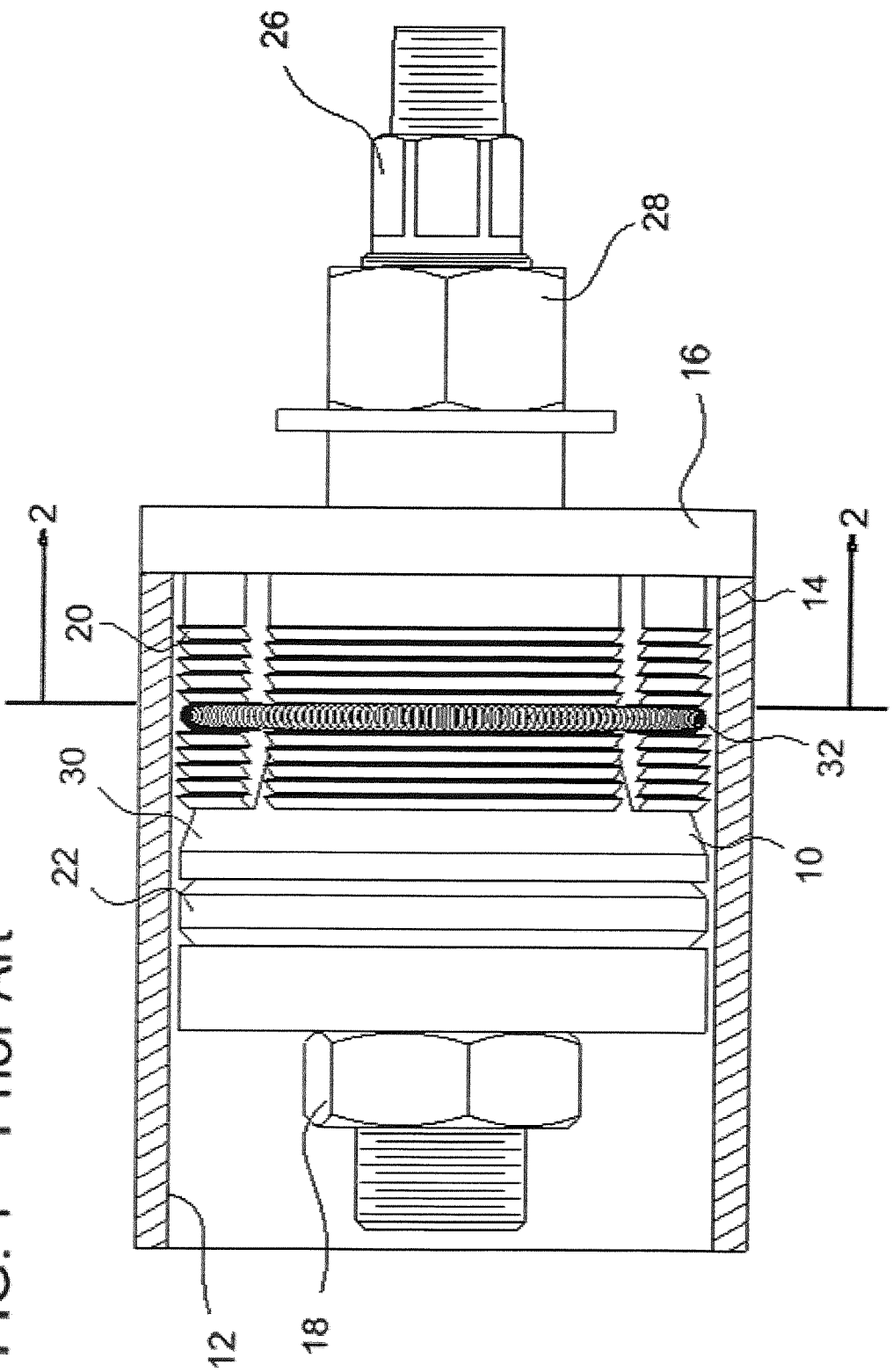
FIG. 1 is an elevational view of a prior art test plug having a standard set of gripper segments loosely positioned within a broken-away showing of a pipe wall.

Embodiments disclosed herein are directed to components enabling a test or isolation plug to engage, frictionally engage, grip, bite, or make intimate contact with an inner diameter or outer diameter wall of a pipe or tube. Embodiments are also provided with respect to test and isolation plugs and assemblies of test and isolation plugs installed within the ends of pipes, tubes or the like.

As discussed above, some test and isolation plugs include one or more grippers capable of being urged radially outward or radially inward into engagement with an inner or outer peripheral wall of a pipe or tube to hold the plug in position during testing or isolation despite the use of high pipe pressurization or other forces that may be present. The grippers may be provided in a set, comprising one or more gripper segments, such as two, four, six or more separate segments or any even or odd number of gripper segments.

When provided in a set of separate grippers, the set may comprise a plurality of separate, aligned segments interconnected and biased inward or outward relative to a section of a test or isolation plug by a spring clip or the like. The set of segments may be closely aligned about or within the test plug; however, they may only be interconnected by a spring clip or the like to enable the gripper segments to expand outward or contract inward in a radial direction into engagement with an inner or outer diameter pipe or tube wall or to be placed in a non-engaging position permitting the plug to be inserted into or onto an open end of a pipe or tube or removed from the open end.

Before turning to embodiments of grippers, a discussion of an exemplary test plug is provided. It should be understood that grippers may be used on any type of plug including test plugs, isolation plugs, plugs having one seal, plugs having two or more longitudinally spaced seals, plugs having passages for pressurizing or depressurizing sections of a pipe, plugs having vents permitting vapor to be vented from within the pipe on an opposite side of the test or isolation plug, plugs that form seals against the inner diameter walls of pipes or tubes, and plugs that form seals against the outer diameter walls of pipes or tubes. It should also be understood that the grippers may be designed to engage substantially circular inner or outer diameters of pipe or tube walls as well as out-of-round pipe or tube walls, square pipe or tube walls, and any other shape of pipe or tube walls.

Test Plugs

Merely for purposes of example, and not for purposes of limitation, an embodiment of a prior art inner diameter test plug 10 is shown in FIGS. 1-4. This particular type of test plug may be used to create a fluid-tight seal against an inner periphery 12 of a pipe or tube 14 adjacent its open end so that the pipe or tube may be subject to pressure testing. For instance, after the plug 10 is properly installed, the pipe or tube 14 may be pressurized with sufficient pressure to test for leaks or for any other purpose. The amount of pressure applied within the pipe 14 depends on the design pressure rating of the pipe 14. The test plug 10 must be able to create a fluid-tight seal that is able to withstand internal pipe working pressures and must remain in a fixed, non-sliding, stationary position within the pipe 14 during testing and resist sliding, movement, blow-out or failure.

The plug 10 must be capable of being placed in a condition such that it is capable of being readily inserted into and through the open end of the pipe or tube 14 without interference from the inner diameter 12 of the pipe 14. See FIGS. 1 and 2. The plug 10 must also assume this position upon removal after testing has been completed. Likewise, for an outer diameter plug, the plug must be capable of being placed in a condition such that it is capable of being readily inserted onto and about the open end of the pipe or tube without interference from the outer diameter of the pipe or tube.

The plug 10 includes a pair of compression elements, such as end plates 16 and 18 and means for causing the end plates, 16 and 18, to move together. Moving the plates, 16 and 18, toward each other ultimately causes the inner diameter 12 of the pipe 14 to be engaged by a set of gripping segments 20 and a sealing element 22. Merely as an example, the end plates, 16 and 18, may be interconnected with a shaft 24, and the end 26 of the shaft 24 may be threadably engagable with a nut 28 so that an installer can screw the nut 28 onto the shaft 24 to cause relative displacement of the end plates, 16 and 18, toward one another.

A camming element 30 or other mechanism may be located between the end plates, 16 and 18, to control the position of the gripper segments 20. For instance, according to one embodiment, the gripper segments 20 may be slidably engagable relative to a frustoconical wall of the camming element 30 on which the set of gripper segments 20 is seated. Relative movement between the camming element 30 and the set of gripper elements 20 can force the set of grippers 20 into positive engagement and intimate contact with the inner periphery 12 of the pipe or tube 14 such that the outer surface of the grippers 20 contact, grip, or bite into the pipe or tube wall thereby gripping the pipe or tube wall. See FIGS. 3 and 4. It should be understood that the camming element 30 provides one means for expanding a set of grippers and that various other different mechanisms could be used to expand a set of grippers into engagement with an inner diameter wall or contract the set of gripper into engagement with an outer diameter wall.

The set of grippers 20 in the illustrated embodiment may include four, annularly-aligned, separate, arc-shaped, segments (see FIGS. 3 and 4) interconnected and biased inwardly into close engagement with the camming element 30 by a spring clip 32. Of course, more or less segments can be utilized and the segments are not required to be arc- shaped or annularly-aligned. This shape and alignment ultimately depends upon the cross-sectional shape of the inner or outer wall of the pipe or tube to be gripped. For instance, the cross-sectional shape of the inner or outer wall could be square, multi-sided, oval, out-of round, or the like.

In the illustrated embodiment, each gripper segment 20 has an inner peripheral tapered wall for slidably engaging the proximal outer frustoconical wall of the camming element 30. Thus, when the end plates, 16 and 18, are inwardly compressed, the grippers 20 are forced up the slope of the outer frustoconical wall and thereby radially outward into gripping engagement with the inner periphery 12 of the pipe 14. See FIG. 3. Of course, this provides only one means of expanding or contracting the set of grippers and any other means, such as levers, pivots, rotation or the like could be utilized.

Figure 3:
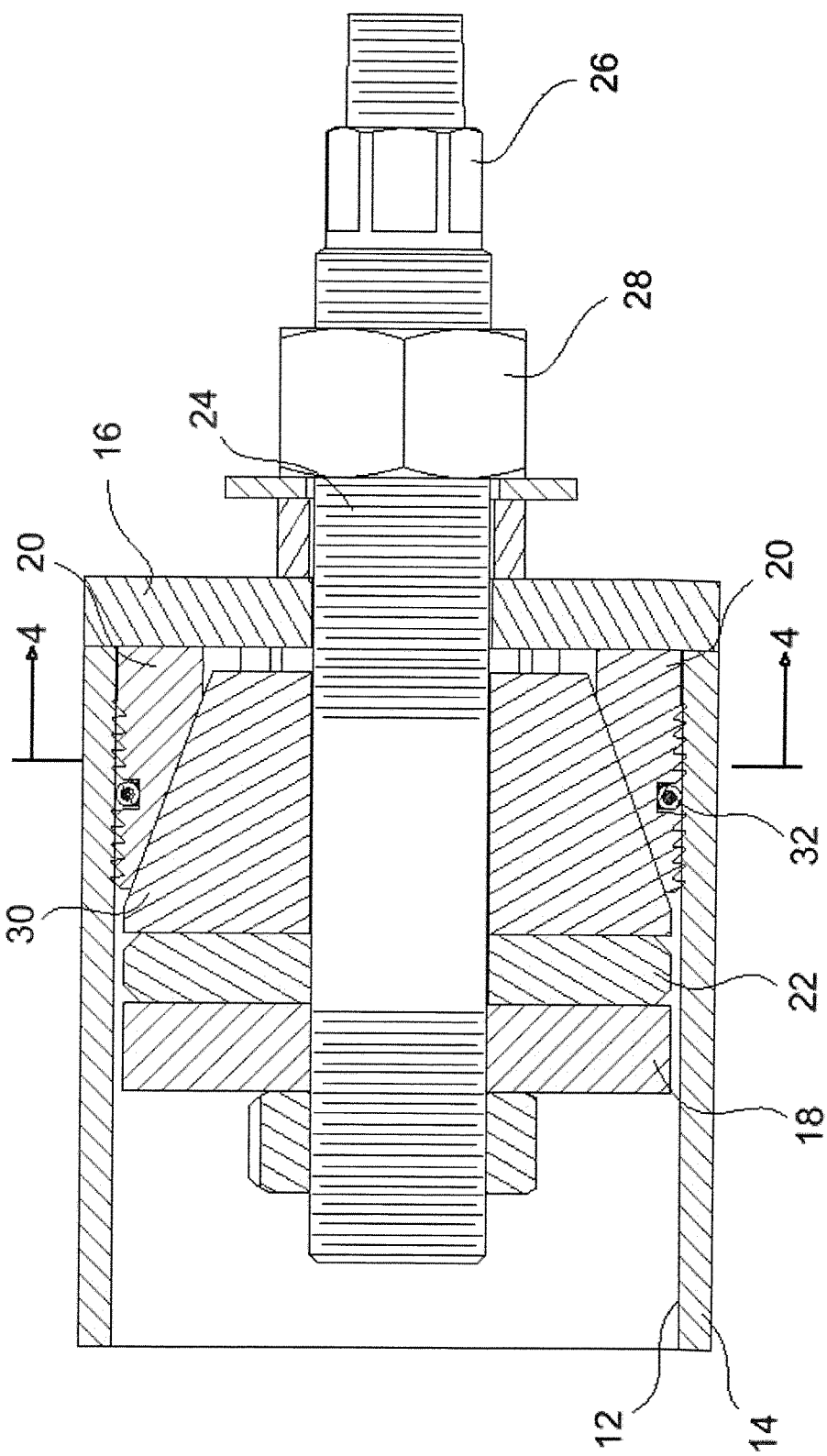
FIG. 3 is a cross-sectional view of the prior art test plug of FIG. 1 expanded into engagement with the inner diameter of the pipe wall.
Figure 4:
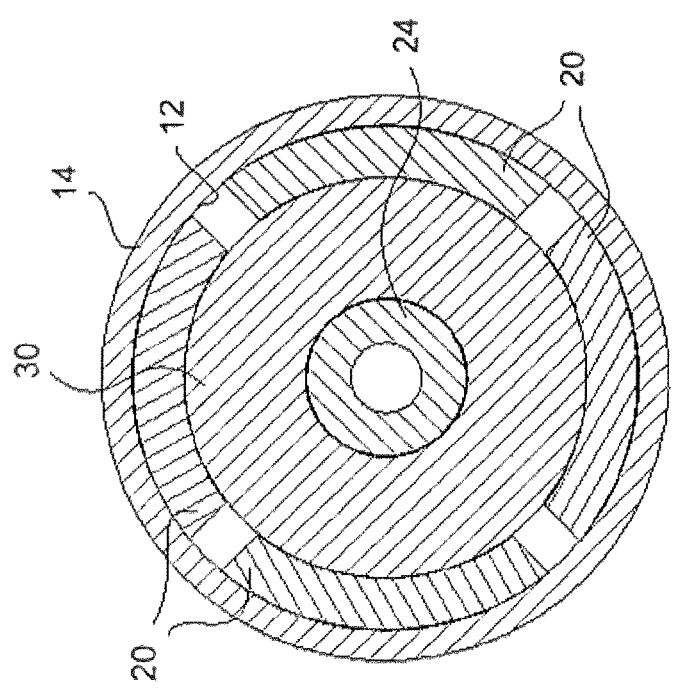
FIG. 4 is a cross-sectional view of the test plug of FIG. 3 along line 4-4.

In addition to the set of grippers 20, the plug 10 may also include a seal element 22 made of elastomeric material which is configured to be deformed into contact with the inner or outer peripheral wall of a pipe or tube. The resiliency of the seal element 22 enables it to conform to a larger or smaller dimension while maintaining integrity or being a pressure boundary and then return to its as fabricated dimension after the pipe or tube is depressurized and the end plates, 16 and 18, are displaced away from one another. For instance, as shown in FIG. 3, the set of grippers 20 are in gripping engagement with the inner periphery 12 of the pipe or tube 14 and further tightening of nut 28 will cause further movement of end plate 18 toward end plate 16 to radially expand seal element 22 into sealing engagement with the inner periphery 12 of the pipe or tube 14.

Figure 2:
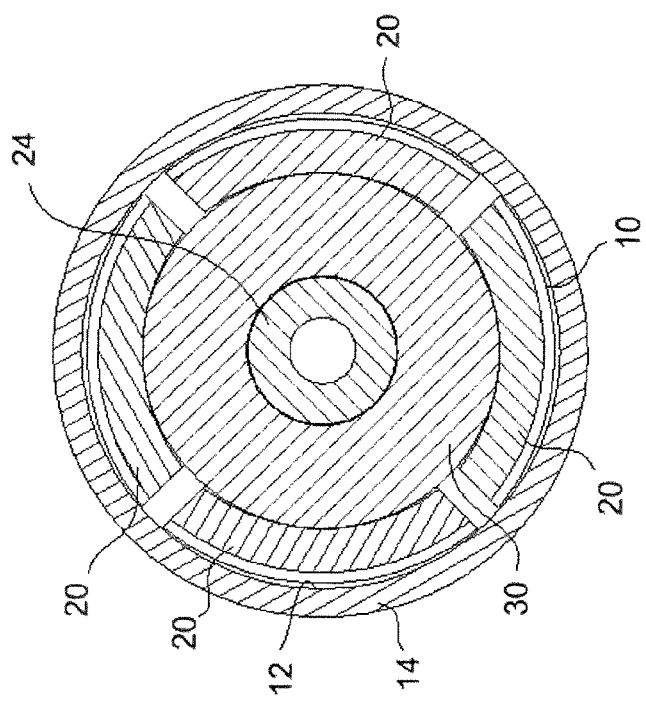
FIG. 2 is a cross-sectional view of the test plug of FIG. 1 along line 2-2.

In use, the plug 10 may be placed inside the pipe or tube 14 through its open end (see FIGS. 1 and 2). The nut 28 is tightened to force the end plates, 16 and 18, toward each other which in turn causes the set of grippers 20 to be forced into engagement with the inner peripheral wall 12 of the pipe 14 (see FIGS. 3 and 4). Further tightening of nut 28 results in the seal element 22 being placed in an expanded condition which is required to form a fluid-tight seal against the inner peripheral wall 12 of the pipe 14. This enables the pipe 14 to be pressured and tested.

Figure 5:
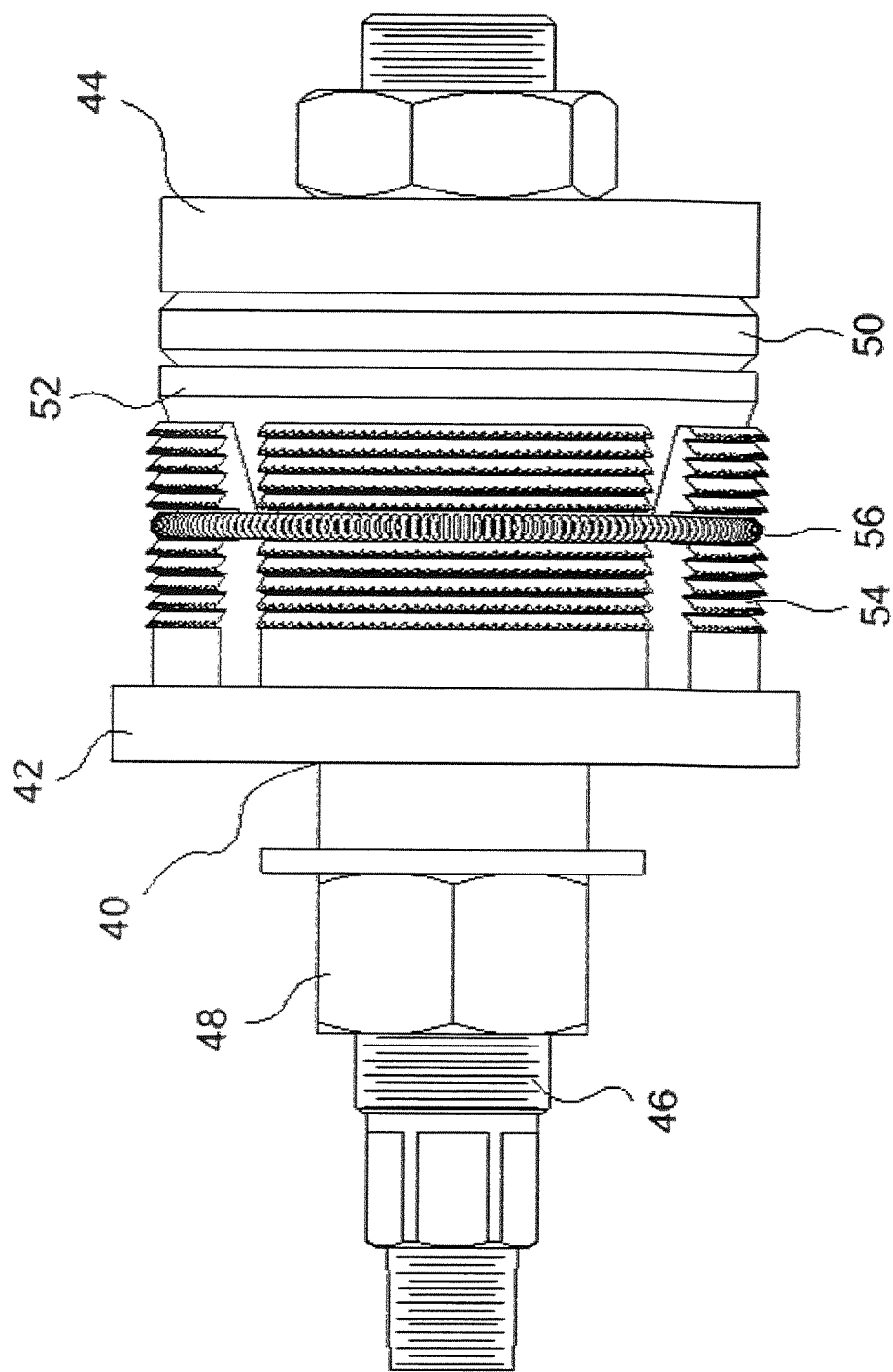
FIG. 5 is an elevational view of a test plug having a serrated set of gripper segments in accordance to an embodiment.
Figure 6:
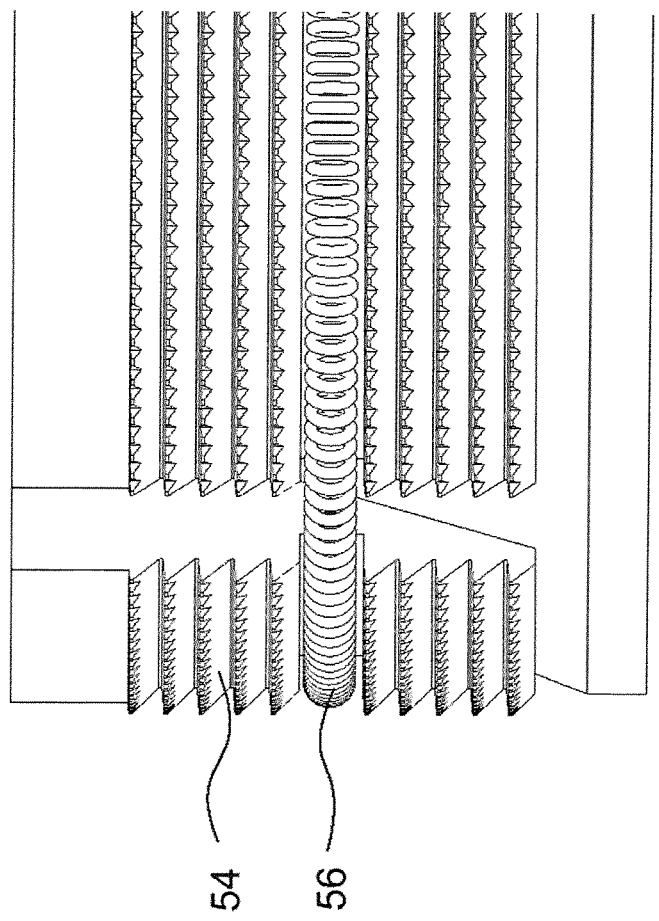
FIG. 6 is a magnified elevational view of serrated teeth of the test plug of FIG. 5 in accordance to an embodiment.

A corresponding test plug 40 is shown in FIG. 5. The test plug 40 includes end plates 42 and 44, a shaft 46, a nut 48, an annular sealing element 50, a camming element 52, a set of grippers 54 and a spring clip 56. However, the test plug 40 differs from test plug 10 in that the outer surface of each gripper segment 54 is different as is discussed in greater detail below and as shown in FIG. 6.

Of course as discussed above, there are many different variations of test and isolation plugs. Some are adapted to test pipes or tubes downstream of the plug, and some are adapted to test the pipe or tube, connection, or flange segment adjacent the open end of the pipe or tube. Some isolation plugs include a pair of spaced apart sealing elements to isolate the end of the pipe or tube from vapors or other substances within the pipe or tube or to test welded connections or the like. Some include vents and other passages for pressurizing, depressurizing, or venting sections of pipe or tube relative to the plug. Still further, some plugs create a seal about the outer wall of a pipe or tube. It should be understood that the gripper design discussed below may be used on any type of test or isolation plug which is provides a pipe or tube wall gripping feature.

Standard Gripper Segment

A so-called "standard" gripper segment 20 used commercially and in test plug 10 is shown in greater detail in FIGS.

Figure 7:
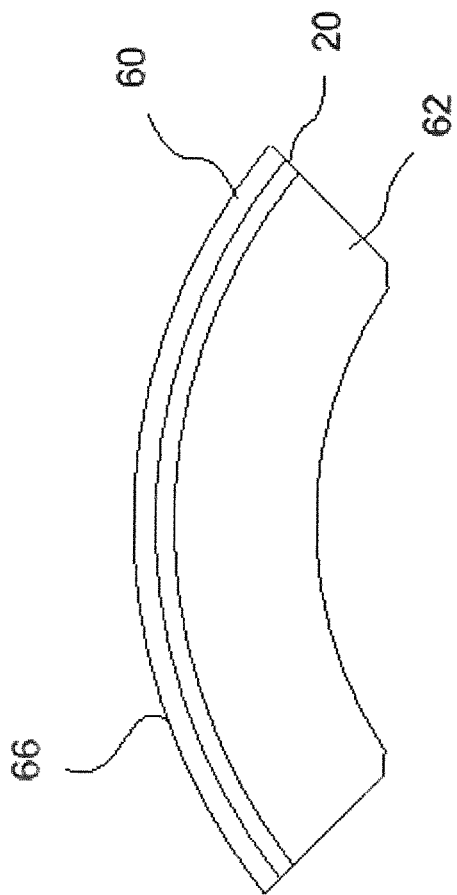
FIG. 7 is a top plan view of a prior art of a standard gripper segment.
Figure 8:
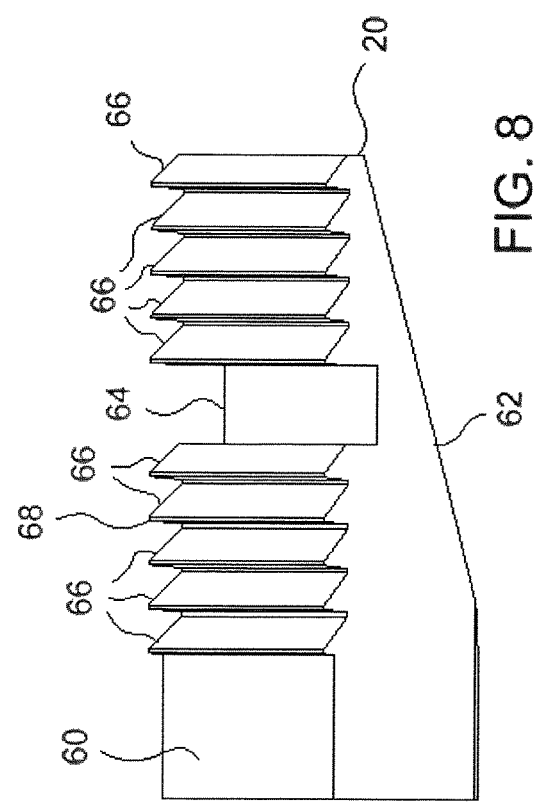
FIG. 8 is a side elevational view of the standard gripper segment of FIG. 7.

7-9. As shown in FIG. 7, the gripper segment 20 forms a segment of a circle so that when multiple of these segments 20 are secured circumferentially about a test or isolation plug, the set of gripper segments 20 are aligned in an annular assembly in position to be expanded into engagement with an inner diameter of a pipe having a circular cross-section as discussed above. As shown in FIG. 8, the segments 20 include an inner peripheral wall 62 that is sloped or tapered for riding up the tapered surface of a camming element. Further, the gripper segment 20 includes a circumferentially-extending recess or slot 64 for receiving a spring clip as discussed above.

The so-called "standard" gripper segment 20 includes an outer surface 60 having a series of elongate, continuous, teeth 66 for engaging, contacting, gripping or biting into the inner diameter of a pipe or tube wall. As best shown in FIG. 8, the gripper segment 20 includes ten, arc-shaped, separate, circumferentially-extending, continuous teeth 66 that are longitudinally spaced-apart. In the illustrated embodiment, five of the elongate, continuous teeth 66 are located on one side of the circumferentially extending spring recess 64 and five are located on the other side of the spring recess 64. Each of the teeth 66 has a tip 68 that extends continuously across the entire circumferential extent of the gripper segment 20. In cross-section, each of teeth 66 has a generally triangular tip 68 for engagement with the pipe wall.

Figure 9:
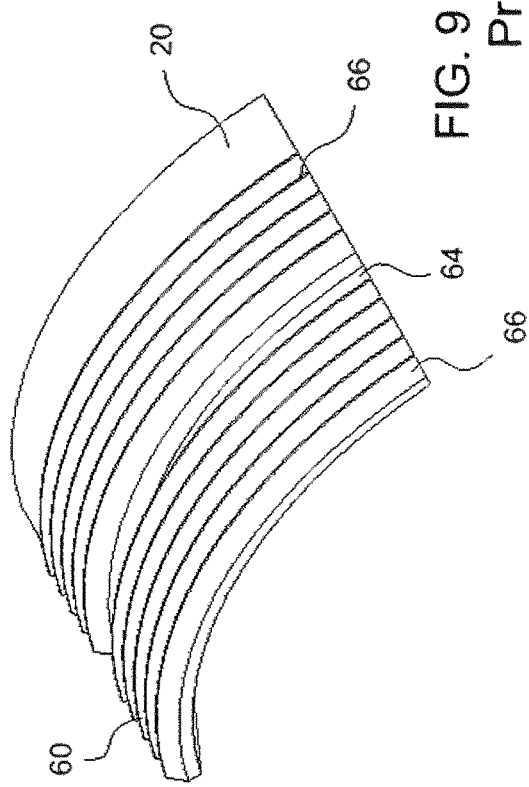
FIG. 9 is a perspective view of the standard gripper segment of FIG. 7.
Figure 10:
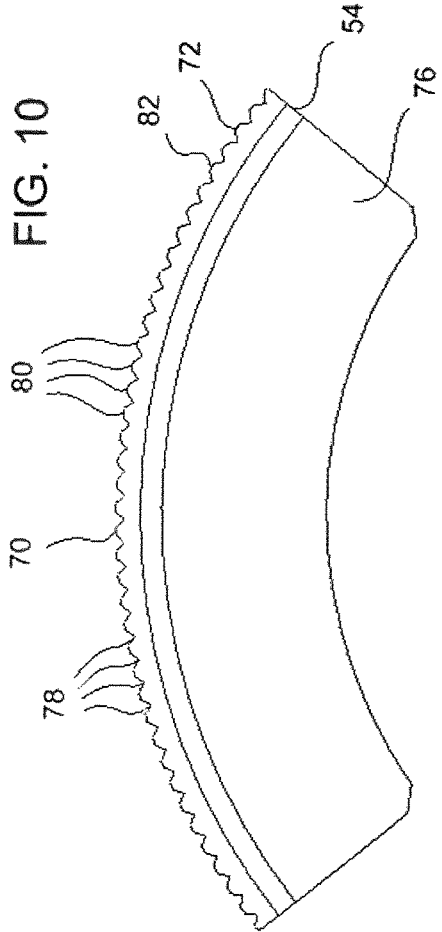
FIG. 10 is a top plan view of a gripper segment in accordance with an embodiment.
Figure 11:
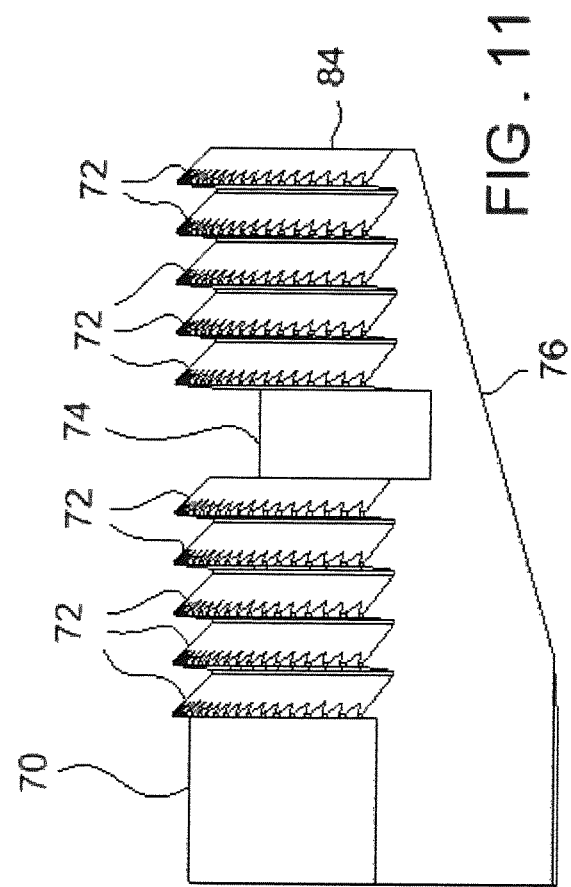
FIG. 11 is a side elevational view of the gripper segment of FIG. 10 in accordance with an embodiment.
Figure 12:
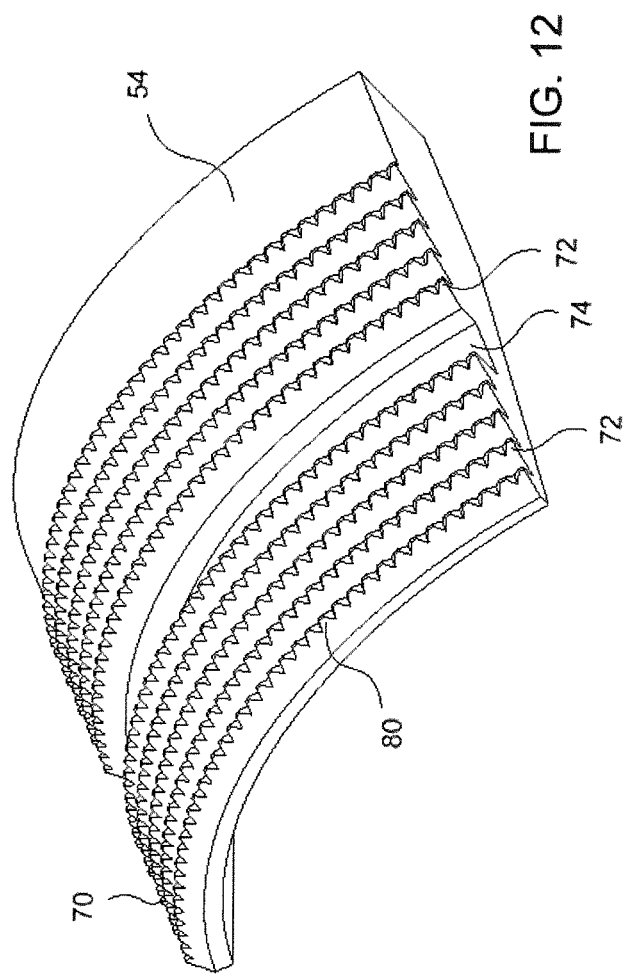
FIG. 12 is a perspective view of the gripper segment of FIG. 10 in accordance with an embodiment.

Thus, the standard test plug has gripper segments 20 with a series of continuous, arc-shaped teeth 66 provided as a set of continuous ridges as shown for instance in FIG. 9. Each of the ridges 66 on the outer surface 60 of the gripper 20 may have a buttress thread shape as shown in FIG. 8 or other threaded pitch. The number of ridges or continuous arc-shaped teeth 66 may vary depending upon the size of the set of gripper segments 20 and the test pressure.

The profile provided by the gripper segment 20 shown in FIGS. 7-9 requires an amount of force to be applied during installation to cause the teeth 66 to engage and frictionally grip the pipe or tube wall to an extent needed to prevent sliding or other unwanted movement of the test plug relative to the pipe or tube. In some instances, the teeth 66 may bite into the wall and deform the pipe or tube by creating a groove in the pipe or tube wall which secures the test plug to the pipe or tube wall during a pressure test. In other instances, the teeth 66 may only need to contact and frictionally engage the wall without deforming the wall.

The continuous circular profile of each of the gripper teeth 66 generally contacts the pipe wall over a relatively large surface area and thereby may require a significant amount of force to create a required grip sufficient to prevent plug sliding, movement, failure or blow-out. In some instances, this may require the gripper to overcome the yield strength and/or hardness of the pipe material making a sufficient grip difficult to achieve on a pipe or tube of relatively high yield strength, hardness and toughness. In addition, problems with creating a sufficient grip relative to non-metallic pipes such as polyethylene (PE), glass reinforced epoxy (GRE), fiberglass and the like may be encountered.

By way of example, the standard gripper segments 20 may be able to engage and grip many types and grades of pipes and tubes. However, the standard gripper segments 20 may not be able to provide sufficient retention force in certain hardened pipes, such as pipes greater than Rockwell C hardness (HRC) 20, tougher steels and alloys, such as 304L Stainless Steel and Nickel based metal alloys, high strength steel, drill pipes, pipes with nickel or alternate high alloy cladding, many grades of stainless steel and high alloys.

Thus, for instance, as test pressure requirements increase and pipes made of harder materials are required, larger amounts of force must be used to cause gripper segments 20 to adequately grip pipe and tube walls. Standard gripping technology is generally limited to use on pipes made of materials having a hardness of no greater than HRC 20. In addition, grippers providing performance and wear improvements relative to all types of pipes and tubes are desired, grippers of prolonged life are desired, grippers that create less continuous damage and deformation of pipe wall are desired, grippers that eliminate damage created by sliding is desired, and grippers that minimize or eliminate the need for pipe repair or rework after testing are desired.

For instance, the gripper segments 20 may bite into a pipe or tube wall and permanently deform the pipe and form relatively circular pattern grooves (i.e., same shape as continuous ridges or teeth of the grippers). At these locations, the pipe or tube material is pushed outward or inward creating ribs in the outer or inner diameter of the pipe wall. In most cases, these ribs are required to be removed after the completion of the test. Even though the deformation created by the gripper 20 may not affect the performance of the pipe, it necessarily creates an undesired appearance and requires additional work and process time to remove. Alternatively, the test section (i.e., section deformed by the gripper biting into the pipe) of the pipe may need to be cut and removed which also results in additional process time and cost.

Serrated Gripper Segments

Thus, according to an embodiment, a gripper segment 54 having an outer surface 70 providing a profile different than that disclosed by FIGS. 7-9 is provided. The gripper profile shown in FIGS. 5, 6 and 10-13 is useful for plugs for use in any type of tube or pipe including and not limited to pipes and tubes made of stainless steel, alloys and other materials of high hardness, non-metallic materials, PE, GRC, fiberglass, or the like. The gripper segment 54 provides improved capabilities to engage, frictionally contact, grip and/or bite into a pipe wall with less force required to install a set of grippers as compared to the gripper segments 20 shown in FIGS. 1-4 and 7-9 and is therefore capable of holding higher test pressure than the gripper segment 20. The gripper segment may be made of metal, plastic, ceramic, or other material.

Thus, the gripper segment 54 is capable of engaging the walls of pipes and tube, including those of hardness higher than HRC 20, with less area of contact of gripper teeth as compared to the gripper 20. In addition, the gripper 54 provides improved holding capacity, an increased safety factor for pressure-assisted sealing, reduced installation torque requirement, and extended service life of the pipe or tube and the grippers.

The gripper segment 54 shown in FIGS. 10-13 is able to provide the above features due to the profile of its surface 70 which, in the illustrated embodiment, is intended to engage an inner diameter of a pipe or tube wall. Of course, the segment could be designed to engage an outer diameter of a pipe or tube wall, or grip a pipe or grip wall that is not circular in cross-section. The gripper segment 54 of the illustrated embodiment may be similar to the standard gripper segment 20 in that it may include a series of circumferentially-extending rows or outward projections that are longitudinally spaced-apart. For instance, the gripper segment 54 may include ten rows of teeth 72 and a spring recess 74. Of course, any number of rows of teeth 72 may be used including as few as two or as many as desired. In addition, the gripper segment 54 may have a tapered wall 76 for sliding on a tapered wall of a camming element.

The gripper segment 54 differs from the standard gripper segment 20 in that each of the rows of teeth 72 has a plurality of gaps 78, such as V-shaped or U-shaped gaps or gaps of any other shape, cut or formed therein. See FIGS. 10 and 13. Thus, each circumferential row 72 is not in the form of a continuous ridge; rather, each row 72 includes an array of gaps 78 that provides each row with serrations thereby providing an alternating array of individual bites or tips 80 and open gaps 78. Thus, the rows 72 do not provide a continuous tip; rather, they are serrated and are provided by a series of spaced-apart individual bites or tips 80 separated by gaps 78.

Each individual bite or tip 80 may have a generally pyramidal shape with a pointed or flat top 82. See FIG. 13. Of course, the bites or tips 80 could be any shape provided that they are separated by gaps 78 and do not form a continuous ridge. The gaps 78 cut into the rows 72 may be axial grooves machined in a direction perpendicular to the radial buttress thread shape grooves to create the arrays of bites or tips 80 and open gaps 78. The depth, shape and the amount of axial grooves may vary and depend upon the size of the gripper, pipe and/or gripper materials, test plug rated pressure, and other factors related to performance and reliability of test and isolation plugs.

The serrated gripper segments 54 require less force to deform and bite into the material forming the wall of a test pipe or tube. The serrated gripper segments 54 also allow tests to be performed in pipes and tubes made of harder materials due to the unique shape of the gripper bites 80. The serrated gripper segments 54 also provide increased holding capability.

Figure 13:
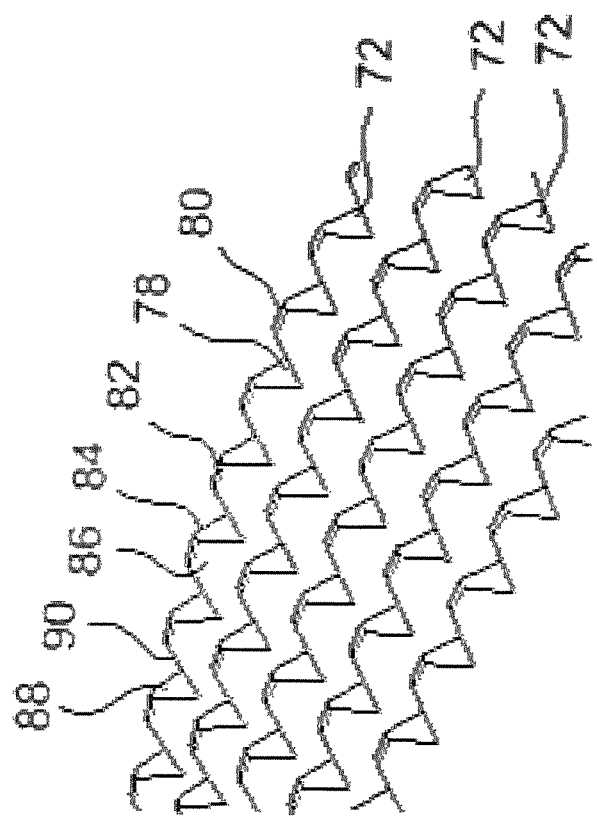
FIG. 13 is a magnified perspective view of a portion of the gripper segment of FIG. 10 in accordance with an embodiment.

The bites or tips 80 as shown in FIG. 13 increase the strength and performance of the serrated gripper 54. Smaller contact area is required and permits the gripper segment 54 to more readily penetrate or bite into a pipe or tube wall. The bites or tips 80 also provide improved strength to withstand higher stress loads in comparison to the continuous solid circular tooth profile shown in FIGS. 1-4 and 7-9. In addition, the serrated gripper segment 54 is more flexible and therefore performs better in polygonal shaped pipes and out-of-round pipes. Here, the gaps 78 provide pivot points permitting the segment 54 to flex into contact with the pipe wall to thereby compensate for any unintentionally out-of-round pipe or tube wall or for pipe or tube walls that may not be circular in cross-section.

The serrated gripper segments 54 also reduce damage to walls of pipes or tubes. As these grippers 54 have reduced contact area in conjunction with a sharper bite or tooth tip profile, less pipe or tube material is defaulted. As a result, secondary work (such as grinding away of deformations created by grippers) can be eliminated. Further, the serrated gripper segments 54 can provide retention in standard material pipes, ASTM-A106, hardened steel and tough alloys such as 304L Stainless Steel and Nickel based alloy metals, non-metallic materials, PE, GRC, fiberglass, and the like.

Figure 14:
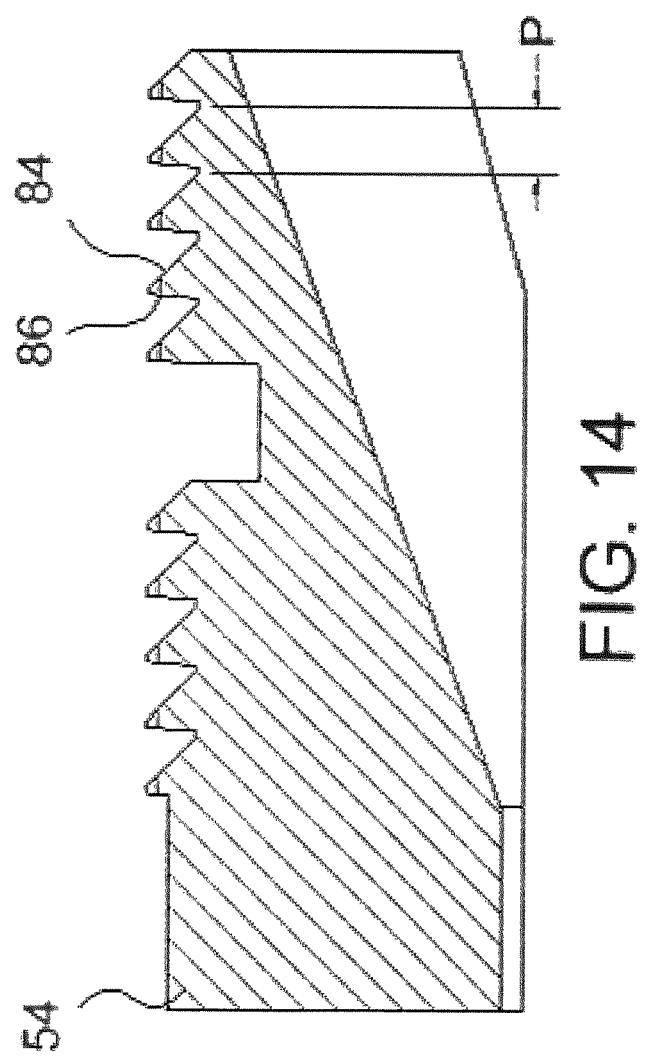
FIG. 14 is a partial cross-sectional view of the gripper segment of FIG. 10 in accordance with an embodiment.
Figure 15:
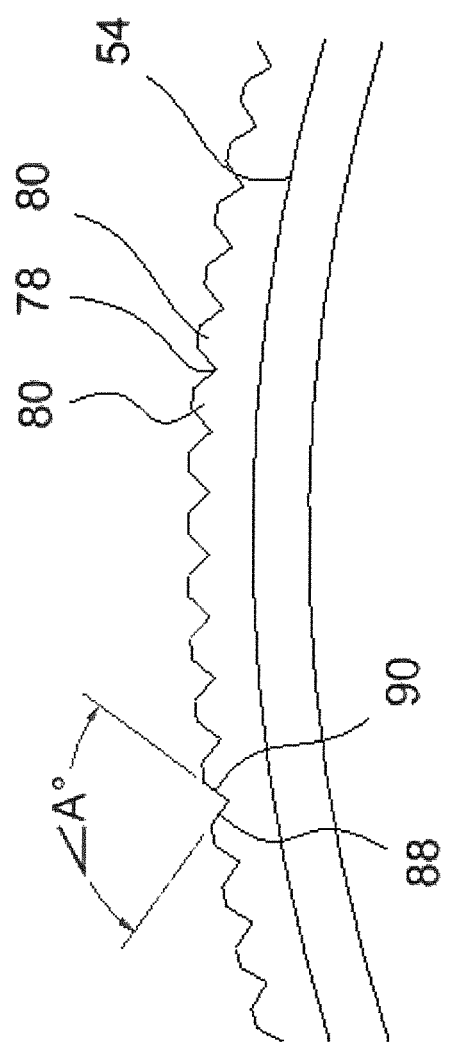
FIG. 15 is a partial cross-sectional view of the gripper segment of FIG. 10 in accordance with an embodiment.

FIGS. 14 and 15 provide cross-sectional views longitudinally and circumferentially of the serrated gripper segments 54. In FIG. 14, the pitch "P" of the circumferential-extending rows 72 of bites or individual tooth tips 80 may be about 0.12 inch. Each wall of the tooth tip 80 may or may not be uniformly tapered. Thus, each tooth tip 80 may lean or point in a particular direction (upstream or downstream directions relative to the pipe or tube). For instance, the angle of taper of the rear wall 84 of each bite or tip 80 may be about 55° and the angle of taper of the front wall 86 of each bite or tip 80 may be about 0° to 5°. See FIG. 14. Alternatively, the angle of taper may be, for instance, 30° for both the front and rear walls, 86 and 84, if directionality is not desired.

In FIG. 15, the gaps 78 between adjacent bites or tips 80 in the same row 72 may be formed by an axial groove such that the angle "A" between adjacent side walls 88 and 90 of bites or tips 80 in the same row 72 is about 90°. Thus, the angle of taper of each of the side walls 88 and 90 may be about 45°. As shown in the illustrated embodiments, the bites or tips 80 in adjacent circumferential rows 72 of bites or tips 80 are aligned; however, the bites or tips 80 may also be offset or staggered in different rows 72.

Although the gripper segment 54 is shown with respect to a gripper for engaging an inner diameter of a round pipe or tube, the rows of teeth can be provided such that they are positioned to engage an outer diameter of a circular pipe or tube. Alternatively, the segment can be provided in a shape to grip a square, multi-sided, or oval pipe or tube cross-sectional shape. In addition, the gripper segment 54 can be used in pipes or tubes harder than HRC 20, can be used to enhance performance and wear in all types of pipes or tubes, provide grippers of longer life, produce less deformation of pipe wall, prevent damage created by sliding, and prevent the need for pipe repair of rework after testing.

Example and Comparative Example

A test plug such as shown in FIG. 5 having a set of standard gripper segments 20 and an otherwise identical test plug having a set of serrated gripper segments 54 were prepared and tested in 4SCH40 sized pipes. The tests were conducted in pipes made of five different materials, namely A106 Grade B, 304 Stainless Steel, 304L Stainless Steel Polished, 4142 High Strength Steel, and 4142 High Strength Steel hardened to HRC 27. The test results are listed in Table 1 provided below.

TABLE 1

| Test Ref. | Pipe Size | Pipe Material | Standard Plug Results | Serrated Gripper Plug Results |
|---|---|---|---|---|
| 1 | 4SCH40 | A106 Grade B | Standard Rated Operation | 3144 PSI - Test Completed Grippers Held |
| 2 | 4SCH40 | 304 Stainless Steel | 2203 PSIG - Test Aborted - Plug movement, Gripper sliding | 3205 PSI - Test Completed Grippers Held |
| 3 | 4SCH40 | 304L Stainless Steel Polished | 887 PSIG - Test Aborted Plug movement, Gripper sliding | 2725 PSI - Test Completed Grippers Held |
| 4 | 4SCH40 | 4142 High Strength Steel | 3025 PSIG - Test Aborted - Plug movement, Gripper sliding | 8098 PSI - Test Completed Grippers Held |
| 5 | 4SCH40 | 4142 High Strength Steel Hardened to HRC 27 | n/a | 10,123 PSI - Test Completed Grippers Held |

Both plugs performed acceptable when used in a pipe made of A106 Grade B. However, for all other pipes, the plug having standard gripper segments 20 was aborted before completion due to plug movement and gripper sliding relative to the pipe. The tests were aborted on the basis that if the test was continued, ultimate failure would result in the test plug being expelled from the pipe with significant force (i.e., plug blow-out).

For a pipe made of 304 Stainless Steel, the plug having the standard gripper segments 20 was aborted due to gripper sliding at 2203 PSI; whereas, in comparison, the test was completed with the plug having the serrated gripper segments 54 at 3205 PSI with no gripper movement. For a pipe made of 304L Stainless Steel Polished, the plug having the standard gripper segments 20 was aborted due to gripper sliding at 887 PSI; whereas, in comparison, the test was completed with the plug having the serrated gripper segments 54 at 2725 PSI with no gripper movement. For a pipe made of 4142 High Strength Steel, the plug having the standard gripper segments 20 was aborted due to gripper sliding at 3025 PSI; whereas, in comparison, the test was completed with the plug having the serrated gripper segments 54 at 8098 PSI with no gripper movement. For a pipe made of 4142 High Strength Steel hardened to HRC 27, a test was completed with the plug having the serrated gripper segments 54 at 10,123 PSI with no gripper movement.

Accordingly, a test plug having a set of the serrated gripper segments 54 outperformed a test plug having a set of standard gripper segments 20. In addition, the tests show that a test plug having a set of the serrated gripper segments 54 may be successfully used on pipes made of 304 Stainless Steel, 304L Stainless Steel Polished, 4142 High Strength Steel, 4142 High Strength Steel hardened to HRC 27, and materials of like hardness. Of course, the serrated gripper segments 54 also provide advantages with respect to all types and sizes of pipes and tubes including non-metallic pipes or tubes.

The foregoing description and specific embodiments are merely illustrative of the principles thereof, and various modifications and additions may be made to the apparatus by those skilled in the art, without departing from the spirit and scope of this invention.

The invention claimed is:

1. A gripper for a test or isolation plug, comprising a gripper segment having a pipe or tube confronting surface with at least three separate circumferentially-extending rows of gripper teeth longitudinally-spaced apart on said surface, each of the separate rows of gripper teeth comprising an alternating array of individual tips and gaps such that each row is serrated, and each of said individual tips having a truncated oblique pyramidal shape.

2. The gripper according to claim 1, wherein said gripper comprises a plurality of said gripper segments adapted for alignment relative to a pipe or tube, and wherein an open slot is located between each adjacent pair of gripper segments.

3. The gripper according to claim 2, wherein each of said gripper segments is an arc-shaped segment.

4. The gripper according to claim 3, wherein each of said plurality of separate rows of gripper teeth project radially outwardly from said surface.

5. The gripper according to claim 4, wherein said plurality of said gripper segments are disposed in an annular alignment.

6. The gripper according to claim 2, wherein said plurality of said gripper segments are interconnected by a spring clip.

7. The gripper according to claim 1, wherein each of said individual tips having a truncated oblique pyramidal shape has four tapered side walls and a flattened top surface.

8. The gripper according to claim 7, wherein the four tapered side walls of each of said individual tips includes a first pair of opposed walls each having an angle of taper of about 45°, and a second pair of opposed walls such that one of the walls has an angle of taper greater than an angle of taper of the other.

9. The gripper according to claim 1, wherein the gripper segment includes an opposite surface that is tapered in the longitudinal direction.

10. The gripper according to claim 1, wherein the gripper segment includes a recess in said surface for receiving a spring clip.

11. The gripper according to claim 1, wherein the gripper segment is made of metal, a ceramic material, or plastic.

12. A test or isolation plug, comprising:
a plug body extending along a longitudinal axis;
at least one elastic seal carried on said plug body; and
a plurality of gripper segments aligned in an assembly on said plug body such that an open slot is located between each adjacent pair of gripper segments, each of said gripper segments having a pipe or tube confronting surface with at least three separate circumferentially-extending rows of gripper teeth longitudinally-spaced apart on said surface, each of the separate rows of gripper teeth comprising an alternating array of individual tips and gaps such that each row is serrated, and each of said individual tips having a truncated oblique pyramidal shape.

13. The plug according to claim 12, wherein each of said gripper segments is arc-shaped.

14. The plug according to claim 13, wherein each of said plurality of gripper segments has a circumferential recess and wherein the plug includes a spring clip for securing the plurality of arc-shaped segments to the plug body.

15. The plug according to claim 12, wherein each of said individual tips having a truncated oblique pyramidal shape has four tapered side walls and a flattened top surface.

16. The plug according to claim 15, wherein the four tapered side walls of each of said individual tips includes a first pair of opposed walls each having an angle of taper of about 45°, and a second pair of opposed walls such that one of the walls has an angle of taper greater than an angle of taper of the other.

17. The plug according to claim 12, further comprising compression elements carried on said plug body on opposite axial sides of said annular seal, said compression elements being movable relative to one another.

18. A pipe and test or isolation plug assembly, comprising:
a pipe or tube having an open end;
a plug body extending within or about the pipe or tube;
at least one annular elastic seal carried on said plug body and in sealing engagement with a wall of the pipe or tube; and
a plurality of gripper segments aligned in an assembly on said plug body such that an open slot is located between each adjacent pair of gripper segments, each of said gripper segments having a pipe or tube confronting surface with at least three separate circumferentially-extending rows of gripper teeth longitudinally-spaced apart on said surface, each of the separate rows of gripper teeth comprising an alternating array of individual tips and gaps such that each row is serrated and such that each of the individual tips has at least three tapered side walls forming a truncated oblique pyramidal shape.

* * * * *